United States Patent
Andres et al.

[11] Patent Number: 5,092,358
[45] Date of Patent: Mar. 3, 1992

[54] PRESSURE REGULATION

[75] Inventors: Rudolf Andres, Sindelfingen; Michael Dimitrov, Mühlacker; Holger Seel, Aidlingen; Dietmar Zwölfer, Hildrizhausen; Hermann Möller, Gärtringen; Klaus-Jürgen Heimbrodt; Gerold Dierks, both of Treuchtlingen; Klaus Engelhardt, Weissenburg; Dieter Simon, Treuchtlingen, all of Fed. Rep. of Germany

[73] Assignees: Mercedes-Benz AG; Walter Alfmeier Gmbh & Co., both of Fed. Rep. of Germany; a part interest

[21] Appl. No.: 705,636

[22] Filed: May 28, 1991

[30] Foreign Application Priority Data

May 25, 1990 [DE] Fed. Rep. of Germany ....... 4016805

[51] Int. Cl.$^5$ .................................. G05D 16/02
[52] U.S. Cl. .................................. 137/16.5; 137/330
[58] Field of Search ................ 137/116.5, 330, 505, 137/505.11, 505.14; 251/230

[56] References Cited

U.S. PATENT DOCUMENTS

| | | | |
|---|---|---|---|
| 2,839,070 | 6/1958 | Berninger et al. | 137/330 |
| 3,559,688 | 2/1971 | Fischer et al. | |
| 3,682,438 | 8/1972 | Klimek | 137/116.5 X |
| 4,134,418 | 1/1979 | Woodcock | 137/116.5 |
| 4,696,320 | 9/1987 | Bull | 137/116.5 |

FOREIGN PATENT DOCUMENTS 2908097  9/1980  Fed. Rep. of Germany .

Primary Examiner—Stephen M. Hepperle

[57] ABSTRACT

A pressure regulator whose initial pressure can be set by manually setting the initial stress of a control spring has a double-seated valve with an inner and outer valve seat and a valve closing element. The valve closing element divides a supply pressure chamber from a control pressure chamber and the latter from a pressure-relief chamber. The inner valve seat is arranged on a control piston which is loaded by the control spring. In order to set a higher initial pressure, the initial stress of the control spring is increased, in order to reduce pressure, the initial stress of the spring is diminished. During this process, the outer or inner valve seat lifts off temporarily from the valve closing element until equilibrium is reestablished by a corresponding pressure chamber and the double-seated valve closes. In order to compensate the hysteresis occurring here, a lifting device is provided which, when the initial stress of the control spring is reduced, briefly lifts off the inner valve seat from the valve closing element and then becomes inactive again. The superproportional pressure drop associated with this in the control pressure chamber has the effect that the equilibrium of forces for closing the double-seated valve is always produced after the outer valve seat is opened by the pressure increase.

17 Claims, 1 Drawing Sheet

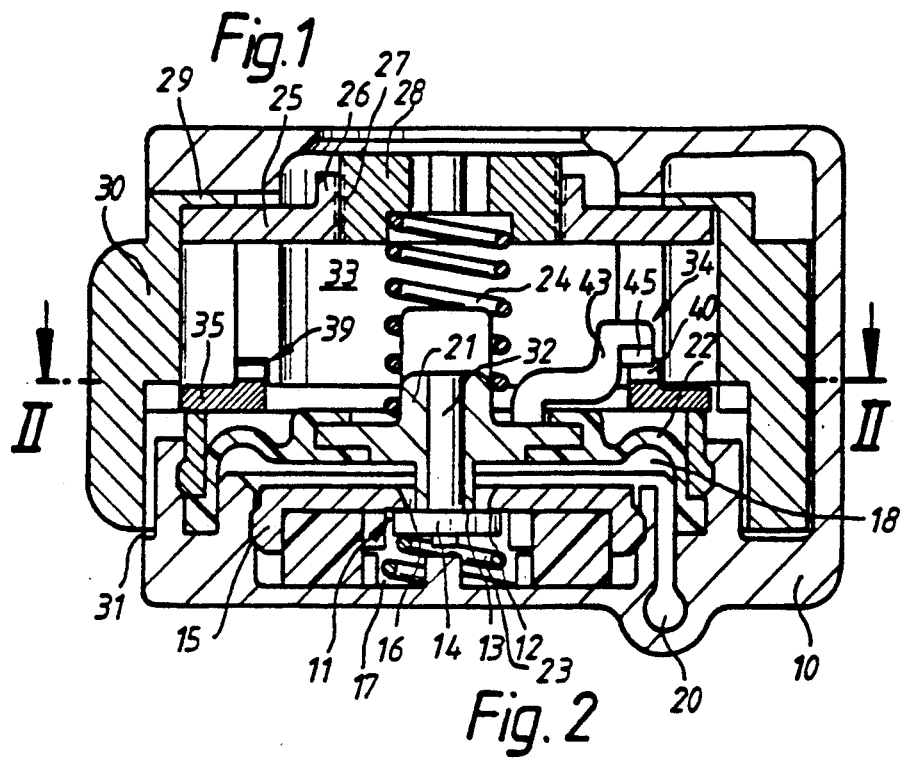
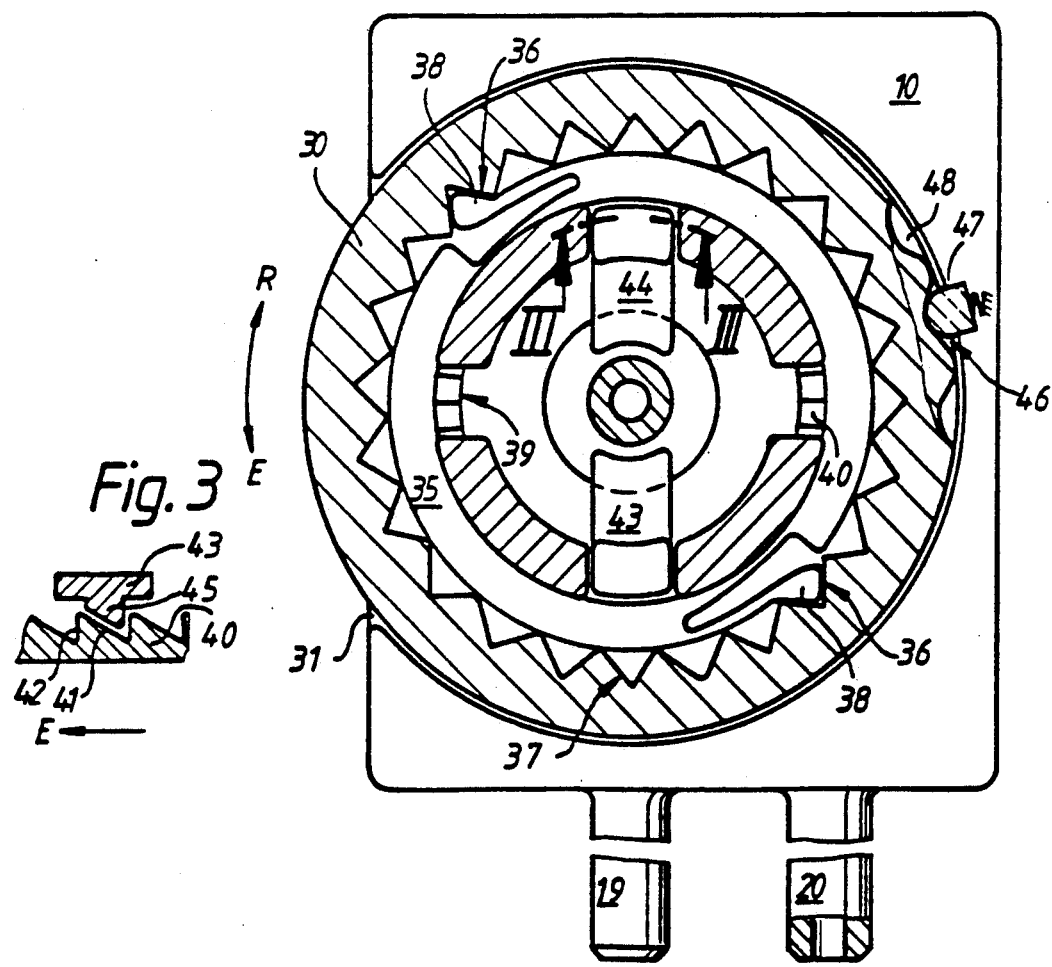

PRESSURE REGULATION

BACKGROUND AND SUMMARY OF THE INVENTION

The invention relates to a pressure regulator and, more particularly, to a pressure regulator having a double-seated valve arranged between a supply pressure and control pressure chamber including a fixed, outer valve seat arranged between the supply pressure chamber and the control pressure chamber which can be connected to a load. A moveable inner valve seat coaxial to the outer valve seat is arranged between the control pressure chamber and a pressure-relief chamber. A valve closing element cooperates with the valve seats and is loaded in a closing direction by the supply pressure in the supply pressure chamber and by a valve closing spring. The valve closing element rests on the outer valve seat in the closed position. The valve closing element has an axially displaceable control piston bearing the inner valve seat on its end side and has an axial pressure-relief chamber. The external diameter of the control piston is greater than the external diameter of the inner valve seat. The control piston is loaded in the opening direction by the control pressure in the control pressure chamber and in the closing direction by a control spring which counteracts the valve closing spring. In the closed position, the control piston rests with the inner valve seat against the valve closing element, and has a manually operable actuating element for changing the initial stress of the control spring.

Such pressure regulators, as disclosed, for example, in German Patent Documents DE 31 44 247 A1 or DE 29 08 097 A1, are used, inter alia, for the pneumatic adjustment of upholstered seat contours of orthopedic vehicle seats. Depending on the level of pressure of the control pressure which can be tapped off at the output of the pressure regulator, the upholstered seat contour assumes different shapes and can thus be individually matched to the desires of the passenger. The pressure level is set manually by means of an actuating element usually constructed as a manual selection wheel which, when performing adjustment, changes the initial stress of the control spring. If the actuating element is adjusted in the direction of greater control pressure, the valve closing element is lifted off the outer valve seat by the control piston as a result of the now stronger spring initial stress, so that a connection is made between the supply pressure chamber and the control pressure chamber. The control pressure prevailing in the control pressure space increases until the sum of the supply pressure and valve closing spring forces on the valve closing element is greater than the difference of the control spring and control pressure forces on the control piston. When the actuating element is rotated in the other direction for the purpose of setting a lower control pressure, the control piston lifts off from the valve closing element with its valve seat as a result of the reduced initial stress of the control spring and thus makes a connection between the control pressure chamber and the pressure-relief chamber connecting to the surrounding atmosphere. The control pressure in the control pressure chamber drops until the force exerted by it on the control piston is smaller than the spring force of the control spring. At this moment, the control piston is placed against the valve closing element again and the valve seat closes.

As a result of component friction and necessary pressure forces of the control spring and valve closing spring for the purpose of sealing the valve seats, the pressure regulator exhibits a hysteresis. That is, an adjustment movement of the actuating element in the direction of control pressure increase, up to a specific actuating element position, leads to a substantially different pressure level of the control pressure from that of an adjustment movement of the actuating element in the direction of control pressure reduction as far as the same actuating element position. Such a hysteresis behavior of the pressure regulator is a substantial disadvantage if—as is usually the case with orthopedic vehicle seats—there are memory aids on the actuating element which are intended to make it possible for each user to remember his individually desired upholstered seat contour. The individual seat contours are finally set after lengthy trials, by virtue of the mark, e.g. number, appearing at the actuating element position and permits the individually matched upholstered seat contours to be found again quickly. It can be found quickly even after it has been changed, without the renewed, wearisome and lengthy trials. In view of the hysteresis behavior of the pressure regulator, these memory aids however are of little use since the user sets different control pressures upon finding the mark again depending on whether he transfers the actuating element into the desired setting from a setting for higher control pressures or from a setting for lower control pressures. 5 The pressure control valve described in U.S. Pat. No. 35 59 688 is also a double-seated valve. In this valve, the valve element is loaded by a double control piston and a valve closing spring, and controls, together with the outer valve seat, the connection from a first valve port to a second valve port and, together with the inner valve seat, the connection between the first valve port and a ventilation outlet. The initiation of the pressure increase and pressure reduction process does not occur by means of a manual actuating element but rather by changing the pneumatic control pressure in a control chamber delimited by the double control piston. This pressure control valve also exhibits the described control hysteresis.

The invention improves a pressure regulator of the above described type in such a way that, irrespective of the adjustment direction of the actuating element, a control pressure of unvarying magnitude is always associated with a specific setting of the actuating element, so that the specific expected control pressure at the output of the pressure regulator in a reproducible manner.

The present invention is achieved with a pressure regulator having a double-seated valve arranged between a supply pressure and control pressure chamber including a fixed, outer valve seat arranged between the supply pressure chamber and the control pressure chamber which can be connected to a load. A moveable inner valve seat is coaxial to the outer valve seat and arranged between the control pressure chamber and a pressure-relief chamber. A valve closing element cooperates with the valve seats and is loaded in a closing direction by the supply pressure in the supply pressure chamber and by a valve closing spring. The valve closing element rests on the outer valve seat in the closed position. The valve closing element has an axially displaceable control piston which bears the inner valve seat on its end side and has an axial pressure-relief chamber. The external diameter of the control piston is greater than the external diameter of the inner valve seat. The control piston is loaded in the opening direction by the control pressure in the control pressure chamber and in the closing direction by a control spring which counteracts the valve closing spring. In the closed position, the control piston rests with the inner valve seat against the valve closing element and has a manually operable actuating element for changing the initial stress of the control spring. The pressure regulator further comprises a lifting device which, on being activated, displaces the control piston in the opening direction by a predetermined amount of travel while lifting the inner valve seat off the valve closing element. An actuating element couples to the lifting device in such a way that, at the start of the adjustment movement of the actuating element out of any adjustment position in the direction of the reduction of the control pressure, the lifting device is briefly activated in such a manner that the control pressure drops below the desired pressure to be reached. As a result of which, after deactivation of the lifting device, the desired pressure is reached as a result of increasing the control pressure.

In the pressure regulator according to the present invention, the slightest adjustment of the actuating element in the direction of control pressure reduction unavoidably lifts off the control piston from the valve closing element in a superproportional or overproportional manner. This brief lifting off results in a brief, superproportional pressure reduction in the control pressure chamber. However, since the lifting unit is immediately deactivated again, that is to say it becomes inactive, the subsequent control process of the pressure regulator is not further disturbed. The excessively high pressure loss in the pressure control chamber is now compensated again in that the control piston lifts off the valve closing element from the outer valve seat and a fluid short circuit is established between the pressure supply chamber and control pressure chamber. As a result of which, the control pressure increases until the valve closing element closes the outer valve seat again. The desired setting of the adjustment element is thus always attained in the pressure regulator by increasing the control pressure - and never by reducing the control pressure so that the state of equilibrium of the double-seated valve is always set from the same direction, namely by pressure increase. Thus, the hysteresis occurring when setting the state of equilibrium if the latter is attained by pressure reduction in the control pressure chamber is eliminated. In the pressure regulator according to the present invention, each setting of the actuating element is thus assigned a fixed control pressure which reliably prevails at the output of the pressure regulator whenever the actuating element assumes the associated position. This occurs regardless of the direction from which the actuating element has arrived at this setting.

Other objects, advantages and novel features of the present invention will become apparent from the following detailed description of the invention when considered in conjunction with the accompanying drawings.

BRIEF DESCRIPTION OF THE DRAWINGS

FIG. 1 is a longitudinal section view of a pressure regulator;

FIG. 2 is a section view along the line II—II in FIG. 1; and

FIG. 3 is a section view along the line III—III in FIG. 2.

DETAILED DESCRIPTION OF THE DRAWINGS

The pressure regulator illustrated in the longitudinal section view in FIG. 1 and in cross-section in FIG. 2 is used, for example, for the pneumatic adjustment of the upholstered seat contour of orthopedic vehicle seats. The pressure regulator contains a double-seated valve 11 which is arranged in a housing 10 and has an outer valve seat 12 and an inner valve seat 13 coaxial thereto. A valve closing element 14 cooperates with the two valve seats 12, 13. The outer valve seat 12 is formed on a conductor piece 15 permanently inset in the housing 10 and encloses a coaxial opening 16 in the conductor piece, via which a supply pressure chamber 17 and a control pressure chamber 18 can be connected to one another. The supply pressure chamber 18 can be connected to a compressed air source via a housing connection 19 which can be seen in FIG. 2 and the control pressure chamber 18 can be connected to the orthopedic vehicle seat via a housing connection 20. The inner valve seat 13 is arranged on the end side of a control piston 21 which protrudes with a projection which is reduced in diameter through the opening 16 in the conductor piece 15. The axially displaceably guided control piston 21 delimits, together with a diaphragm 22, the control pressure chamber 18. A pressure-relief bore 32 which axially penetrates the control piston 21 leads on the one hand into the inner valve seat 13 and on the other hand into a pressure-relief chamber 33 which is delimited on the bottom by the control piston 21 and the diaphragm 22. The pressure-relief chamber 33 connects to the surrounding atmosphere. The valve closing element 14 is placed against the outer valve seat 12 by a valve closing spring 23 which is supported in the housing 10. The inner valve seat 13 is placed against the valve closing element 14 on its other side by a control spring 24. The control spring 24 is constructed as a helical compression spring which is supported on the one hand on the reverse of the control piston 21 facing away from the inner valve seat 13 and on the other hand on a spring counterbearing 25 lying axially opposite. The flange-like spring counterbearing 25 has a hub 26 with internally threaded bore 27 into which an adjustment screw 28 is screwed. The control spring 24 is supported directly on the adjustment screw 28. The spring counterbearing 25 is supported on the housing 10 via an annular web 29 of an actuating element in the form of a setting ring 30. The spring counterbearing 25 is held fixed in terms of rotation by corresponding contours in the housing 10, but can move in the axial direction. By means of the adjustment screw 28, the initial stress of the control spring 24 can be adjusted.

The cylindrical setting ring 30 is held coaxially in the housing 10 in a rotatable manner and protrudes partially out of the housing 10 through a housing opening 31, so that it can be manually rotated. The coaxial annular web 29 which engages between the spring counterbearing 25 and a housing part and is integrally formed onto the setting ring 30 is constructed as a so-called control incline. One annular face of the control incline rises in the axial direction so that when the setting ring 30 is rotated the spring counterbearing 25 resting against the control face experiences an axial displacement.

If the setting ring 30 is rotated in one direction in order to set a higher control pressure at the output of the pressure regulator, the spring counterbearing 25 is axially displaced in the direction of the control piston 21. By means of the control piston 21 with diaphragm 22, the valve closing element 14 is now lifted off the outer valve seat 12 by the now greater initial stress of the control spring 24, so that a fluid short circuit results between the supply pressure chamber 17 and the control pressure chamber 18. This fluid short circuit is maintained until the pressure in the supply pressure chamber 17—and thus in the control pressure chamber 18—has increased to the extent that its force resulting from the area of control piston 21 and diaphragm 22 is in equilibrium with the control spring 24. In this process, the control spring 24 is compressed and the valve closing element 14 again comes to rest on the outer valve seat 12.

When the desired pressure reduction occurs, the control spring 24 is relieved by rotating the setting ring 30 in the opposite direction, so that the high control pressure prevailing in the control pressure chamber 18 lifts off the control piston 21 with its diaphragm 22 from the inner valve seat 13. As a result, the control pressure chamber 12 is connected to the pressure-relief chamber 33 by means of the pressure-relief bore 32. The pressure-relief chamber 33 connects to the surrounding atmosphere. The pressure reduction in the control pressure chamber 18 resulting from this in turn occurs until there is a state of equilibrium between control spring 24 and the pressure in the control pressure chamber 18 acting on the control piston 21 and diaphragm 22. When the equilibrium state is reached, the inner valve seat 13 comes to rest against the valve closing element 14 and the control pressure chamber 18 is closed off again.

In this control process, hysteresis unavoidably occurs. This has the result that for the same setting of the setting ring 30, a different control pressure is compensated in the control pressure chamber 18 depending on whether the setting of the setting ring 30 is achieved in the direction of pressure increase or in the direction of pressure reduction. In order to compensate for this hysteresis, i.e. to obtain an identical control pressure in the same setting of the setting ring 30, irrespective of the direction of rotation of the setting ring 30 in which this setting is searched for, the control piston 21 is assigned a lifting device 34. On being activated, the lifting device displaces the control piston 21 by a predetermined amount of travel in the opening direction while lifting off the inner valve seat 13. This lifting device 34 is coupled to the setting ring 30 in such a manner that it is briefly activated in the direction of reduction of the control pressure at the start of each adjustment movement of the setting ring 30 out of any setting. Due to this brief activation of the lifting device 34 at the start of each adjustment movement in the direction of control pressure reduction, the inner valve seat 13 is unavoidably lifted off from the valve closing element 14 in a superproportional manner. This superproportional opening of the connection between control pressure chamber 18 and pressure-relief chamber 33 initially results in an extremely brief superproportional pressure reduction in the control pressure chamber 18. This extremely brief superproportional pressure reduction in the control pressure chamber 18, which cannot be felt by the user, also means that, after deactivation of the lifting device 34, i.e. after it becomes inactive, this excessively high pressure loss in the control pressure chamber 18 has to be compensated again. That is, the control pressure chamber 18 has to be filled again since the double-seated valve 11 is no longer in equilibrium. Now, a pressure increasing process occurs as described above. Even when rotating the setting ring 30 in the direction of control pressure reduction, the state of equilibrium of the double-seated valve 11 is thus achieved from the same direction, namely by pressure increase, as is also the case when the setting ring 30 is rotated in the direction of control pressure increase. Since the desired control pressure is thus always set by means of pressure increase irrespective of the direction of rotation of the setting ring 30, the hysteresis associated with the pressure regulator is not noticeable.

More specifically, the lifting device 34 has a rotary disc 35 which is coupled to the setting ring 30 via a coupling element 36 in such a way that said lifting device 34 is only entrained by the setting ring 30 in the adjustment direction for the purpose of control pressure reduction (Arrow R in FIG. 2). For this purpose, the setting ring 30 has an internal toothing 37 in its inner wall region lying opposite the rotary disc 35. Two resilient locking hooks 38 project diametrically from the rotary disc 35 and engage in the internal toothing 37. The two locking hooks 38 are constructed in such a manner that when the setting ring 30 is rotated in the direction of pressure reduction R, they lock tight in the internal toothing 37 and thus the rotary disc 35 is coupled fixed in terms of rotation to the setting ring 30. When the setting ring 30 is rotated in the inverse direction of rotation, that is to say in the direction of pressure increase (Arrow E in FIG. 2), they slide resiliently along the internal toothing 37 so that the rotary disc 35 remains unaffected.

The rotary disc 35 bears a coaxial gear ring 39 with said tooth-like teeth 40 projecting in the axial direction. According to FIG. 3, every tooth 40 has a rising edge 41 rising in the entrainment direction R of the rotary disc 35 and a steep drooping edge 42 adjacent thereto. The height of the teeth 40 is dimensioned according to the desired superproportional travel of the control piston 21. Mounted diametrically to one another on the control piston 21 on the rear side facing away from the valve seat 13 are two arms 43, 44 which initially protrude axially from the control piston 21 and then extend in the radial direction. The one arm 43 is illustrated in the plane of the drawing in FIG. 1 rotated through 90°. The arms 43, 44 engage over the gear ring 39 of the rotary disc 35 and bear in each case with one web on their lower side facing the gear ring 39, of which only the web 45 of the arm 43 can be seen in FIGS. 1 and 3. The free end face of the webs 45 is matched to the tooth contour of the teeth 40, so that the webs 45 rest with a broad face on a rising edge 41 of a tooth 40 and rest laterally against the dropping edge 42 of the adjacent tooth 40. The web width is somewhat smaller in the circumferential direction than the length of the rising edge 41, so that a sufficient support area is obtained on the teeth 40. When the rotary disc 35 is rotated in the direction R, in each case one tooth 40 slides away below the webs 45, the two arms 43, 44 and thus the control piston 21 being displaced in the axial direction and then engage over the dropping edge 42 on the next tooth 40, the axial displacement of the control piston 21 being then retracted. The control piston 21 travel thus brought about is sufficient to lift off the inner valve seat 13 from the valve closing element 14 to a sufficient degree.

The minimum displacement path to be observed when rotating the setting ring 30 and the associated rotation of the rotary disc 35 is determined by the width of the teeth 40, that is to say by the length of the rising edges 41. It can be ensured that this minimum displacement path is always observed by means of a catch or detent 46, indicated in FIG. 2 on the right, consisting of a spring-loaded locking body 47 held on the housing and an external toothing 48 on the setting ring 30.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A pressure regulator having a double-seated valve arranged between a supply pressure and control pressure chamber including a fixed, outer valve seat arranged between the supply pressure chamber and the control pressure chamber which can be connected to a load, a moveable inner valve seat coaxial to said outer valve seat and arranged between the control pressure chamber and a pressure-relief chamber, and a valve closing element cooperating with said valve seats and loaded in a closing direction by the supply pressure in the supply pressure chamber and by a valve closing spring, said valve closing element resting on the outer valve seat in the closed position, said valve closing element having an axially displaceable control piston which bears said inner valve seat on its end side and has an axial pressure-relief chamber, the external diameter of said control piston being greater than the external diameter of the inner valve seat, said control piston being loaded in the opening direction by the control pressure in the control pressure chamber and in the closing direction by a control spring which counteracts the valve closing spring, and in the closed position rests with the inner valve seat against the valve closing element, and having a manually operable actuating element for changing the initial stress of the control spring, said pressure regulator further comprising a lifting device which, on being activated, displaces the control piston in the opening direction by a predetermined amount of travel while lifting the inner valve seat off the valve closing element;

an actuating element coupling to said lifting device in such a way that, at the start of the adjustment movement of the actuating element out of any adjustment position in the direction of the reduction of the control pressure, said lifting device is briefly activated in such a manner that the control pressure drops below the desired pressure to be reached, as a result of which, after deactivation of the lifting device, the desired pressure is reached as a result of increasing the control pressure.

2. A pressure regulator according to claim 1, wherein said lifting device includes an annular rotary disc entrained by the actuating element in the event of an adjustment movement in the direction of control pressure reduction, said rotary disc bearing a coaxial gear ring having sawtooth teeth projecting in the axial direction, some teeth edges rising slowly in the direction of rotation and other tooth edges of which subsequently drop away steeply;

two diametrically opposite, axially projecting webs rigidly connected to the control piston, the contour of said webs is matched to the tooth contour of the gear ring in such a manner that with their end side they rest in each case on a slowly rising tooth edge of a tooth and with one side face slide along the steeply falling tooth edges when the rotary disc rotates.

3. A pressure regulator according to claim 2, wherein said control piston bears on its side facing away from the control pressure chamber two arms which extend away radially outwards, said two arms engage over the gear ring and on their lower side facing the gear ring in each case bear one of the webs.

4. A pressure regulator according to claim 2, wherein the width of said webs extending in the circumferential direction of the rotary disc corresponds approximately to the tooth width, said webs having on their end side in each case a slope running parallel to the slowly rising tooth edge of the teeth.

5. A pressure regulator according to claim 3, wherein the width of said webs extending in the circumferential direction of the rotary disc corresponds approximately to the tooth width, said webs having on their end side in each case a slope running parallel to the slowly rising tooth edge of the teeth.

6. A pressure regulator according to claim 1, wherein said actuating element is constructed as a setting ring which is coaxial with the rotary disc and bears on its inner wall facing the rotary disc a circumferential toothing which cooperates, in the manner of a ratchet coupling, with at least one locking hook arranged resiliently on the rotary disc.

7. A pressure regulator according to claim 2, wherein said actuating element is constructed as a setting ring which is coaxial with the rotary disc and bears on its inner wall facing the rotary disc a circumferential toothing which cooperates, in the manner of a ratchet coupling, with at least one locking hook arranged resiliently on the rotary disc.

8. A pressure regulator according to claim 3, wherein said actuating element is constructed as a setting ring which is coaxial with the rotary disc and bears on its inner wall facing the rotary disc a circumferential toothing which cooperates, in the manner of a ratchet coupling, with at least one locking hook arranged resiliently on the rotary disc.

9. A pressure regulator according to claim 4, wherein said actuating element is constructed as a setting ring which is coaxial with the rotary disc and bears on its inner wall facing the rotary disc a circumferential toothing which cooperates, in the manner of a ratchet coupling, with at least one locking hook arranged resiliently on the rotary disc.

10. A pressure regulator according to claim 7, wherein a catch is arranged on the setting ring in such a manner that the same rotary movement of the setting ring is divided into strictly predetermined identical travel intervals, each travel interval being dimensioned in such a manner that the gear ring of the rotary disc turns away under the web by at least one tooth width.

11. A pressure regulator according to claim 8, wherein a catch is arranged on the setting ring in such a manner that the same rotary movement of the setting ring is divided into strictly predetermined identical travel intervals, each travel interval being dimensioned in such a manner that the gear ring of the rotary disc turns away under the web by at least one tooth width.

12. A pressure regulator according to claim 9, wherein a catch is arranged on the setting ring in such a manner that the same rotary movement of the setting ring is divided into strictly predetermined identical travel intervals, each travel interval being dimensioned in such a manner that the gear ring of the rotary disc turns away under the web by at least one tooth width.

13. A pressure regulator according to claim 1, wherein said control spring is constructed as a helical compression spring which is supported on the one hand on the control piston and on the other hand on a spring counterbearing, said spring counter bearing is held fixed in terms of rotation but is axially displaceably, said actuating element, in particular the setting ring, engages with an axially rising incline, constructed on a circular path, on the spring counterbearing, in such a manner that in the event of an adjustment movement of the actuating element the spring counterbearing is displaced in the axial direction of the control spring.

14. A pressure regulator according to claim 2, wherein said control spring is constructed as a helical compression spring which is supported on the one hand on the control piston and on the other hand on a spring counterbearing, said spring counter bearing is held fixed in terms of rotation but is axially displaceably, said actuating element, in particular the setting ring, engages with an axially rising incline, constructed on a circular path, on the spring counterbearing, in such a manner that in the event of an adjustment movement of the actuating element the spring counterbearing is displaced in the axial direction of the control spring.

15. A pressure regulator according to claim 3, wherein said control spring is constructed as a helical compression spring which is supported on the one hand on the control piston and on the other hand on a spring counterbearing, said spring counter bearing is held fixed in terms of rotation but is axially displaceably, said actuating element, in particular the setting ring, engages with an axially rising incline, constructed on a circular path, on the spring counterbearing, in such a manner that in the event of an adjustment movement of the actuating element the spring counterbearing is displaced in the axial direction of the control spring.

16. A pressure regulator according to claim 4, wherein said control spring is constructed as a helical compression spring which is supported on the one hand on the control piston and on the other hand on a spring counterbearing, said spring counter bearing is held fixed in terms of rotation but is axially displaceably, said actuating element, in particular the setting ring, engages with an axially rising incline, constructed on a circular path, on the spring counterbearing, in such a manner that in the event of an adjustment movement of the actuating element the spring counterbearing is displaced in the axial direction of the control spring.

17. A pressure regulator according to claim 6, wherein said control spring is constructed as a helical compression spring which is supported on the one hand on the control piston and on the other hand on a spring counterbearing, said spring counter bearing is held fixed in terms of rotation but is axially displaceably, said actuating element, in particular the setting ring, engages with an axially rising incline, constructed on a circular path, on the spring counterbearing, in such a manner that in the event of an adjustment movement of the actuating element the spring counterbearing is displaced in the axial direction of the control spring.

* * * * *